Patented Aug. 23, 1932

1,873,105

UNITED STATES PATENT OFFICE

MADHAV R. BHAGWAT, OF BROOKLYN, NEW YORK, ASSIGNOR TO COMBUSTION UTILITIES CORPORATION, OF NEW YORK, N. Y., A CORPORATION OF MAINE

PRECIPITATION OF RESIN FROM RESIDUAL OILS

No Drawing.   Application filed November 26, 1928.   Serial No. 322,096.

This invention relates to the production of synthetic resins, and more particularly to a method for recovering soluble and fusible resins of the bakelite "A" type from a solution or colloidal suspension thereof in hydrocarbon oil.

It has been previously proposed to produce synthetic resins by direct condensation of the tar acid content of a coal tar distillate with formalin in the presence of a suitable catalyst. When tar oils, such as a low temperature tar distillate or the tar acid containing fractions of a coke oven tar, are heated with formalin or its equivalent in the presence of a basic catalyst, a soluble and fusible ("A" type) condensation product of the tar acid and the formaldehyde is precipitated. On subsequent heating this condensation product may be converted to an insoluble, infusible ("C" type) resin. It has been observed that the hydrocarbon oil component of the tar distillate or fraction thus treated, most of which remains as a residual oil after precipitation of the condensation product, usually retains an appreciable portion of condensation product in solution or colloidal suspension. Recovery of the portion of condensation product thus remaining in suspension in the residual oil has been attempted in various ways, for example, by distillation treatment. All methods heretofore proposed for effecting separation of the portion of condensation product thus remaining in colloidal suspension or solution in the residual oil have proven to be impracticable; usually because the treatment impaired the quality of the resins in some way, as by subjecting them to heat sufficient to convert them into an insoluble form. The quantity of resins thus retained in suspension or solution in the residual oil often represents a very considerable proportion (up to 30 to 35%) of the theoretical yield from the coal tar treated. Accordingly recovery of this portion of the condensation product from the residual oil is exceedingly desirable both from the standpoint of increasing the yield of the condensation product and also from the standpoint of effecting purification of the residual oil to enable its further utilization.

The primary object of the present invention is to provide a process whereby the recovery of soluble and fusible resins from a solution or colloidal suspension thereof in hydrocarbon oil may be effected without impairment of the quality either of the resins or of the purified oil.

This invention is based on the discovery that by intimately mixing with a dilute mineral acid solution the residual oil remaining after a formaldehyde condensation treatment of a high or low temperature tar distillate and the separation of the said oil layer from the aqueous layer and the precipitated condensation product, it is possible to effect substantially complete separation from such residual oil of any soluble and fusible ("A" type) resin associated therewith without impairing the qualities either of the oil or of the resin. The neutral oil resulting from the treatment contains substantially no resins in solution or suspension and can be used for many purposes with little or no further treatment. For example it may be used directly as a fuel oil; and it may be used as a spray oil and plant insecticide when emulsified with water preferably with the aid of an emulsifying agent such as a water soluble soap, sulphonic acid, or the like. The dilute mineral acid employed in the treatment separates by simple gravity settling into an aqueous layer which can be drawn off, filtered if necessary, and reused. While the preferred reagent for use in effecting the separation of the resin from the residual oil is a dilute mineral acid solution, such as hydrochloric or sulphuric acid, the invention contemplates the use of other materials (for example salts of aluminum, iron and other polyvalent metals such as ferric chloride) capable of breaking down the colloidal suspension of the resin in the oil and of thereby precipitating the resin out of the residual oil.

Following is a specific example illustrating a preferred method of carrying out the invention: 1000 cc. of the hydrocarbon oil residue remaining after a formalin condensation treatment of a primary tar distillate having a boiling range up to 300° C. was shaken with 150 cc. of a 15% hydrochloric acid solution. The neutral oil-acid mixture was then allowed to stand for a brief period until separation of the resins occurred. The resins liberated from the oil by the above treatment rapidly settled to the bottom of the vessel, and purified neutral oil separated in a layer at the top of the vessel, while the acid treating-solution formed an aqueous layer between the purified oil and the separated resin. The resin layer was drawn off and dried on a steam bath and was found to represent about 25% of the weight of the main body of resin formed during the original formalin condensation treatment of the tar distillate. The aqueous acid layer was then drawn off and set aside for use in treating another batch of residual oil. The purified oil contains no resin in suspension or solution and compares favorably in purity and color with other hydrocarbon oils of similar gravity and boiling point range.

The purified neutral oil or residual oil has a relatively low viscosity, a specific gravity of substantially .92–.93, a "sulphonation residue" value of from 33 to 39%, and is substantially free from resinous condensation products. As previously indicated, it may be employed without further treatment as a fuel oil; and it may also be employed as the base for plant insecticides and lubricants, when suitably emulsified with water by means of the usual emulsifying agents such as water-soluble soaps and the like.

Instead of using dilute hydrochloric acid in the above example a dilute solution of sulphuric acid of equivalent strength can be substituted therefor.

Similar results were obtained on treating the oil residue remaining after a formalin condensation of a high temperature coal tar distillate with a dilute sulphuric acid solution or with equivalent demulsifying agents such as those disclosed above.

The invention having been thus described, what is claimed as new is:

1. The method of recovering heat-sensitive, soluble and fusible resins of the phenol formaldehyde potentially reactive type from a colloidal suspension thereof in the hydrocarbon oil components of a tar distillate, which comprises treating the said suspension with a chemical treating agent capable of disrupting the suspension and of precipitating the resin therefrom, separating the thus precipitated resin, and carrying out the said treatment and the step of separation respectively at temperatures sufficiently low to prevent substantial conversion of the heat-sensitive resins into the insoluble, infusible form.

2. The method of recovering soluble and fusible synthetic resins of the phenol formaldehyde type from a colloidal suspension thereof in the hydrocarbon components of a tar distillate, comprising treating the suspension with a dilute aqueous solution of a mineral acid, thereby disrupting the suspension and precipitating the soluble and fusible resins, separating from the purified oil the resins thus liberated, and employing temperatures sufficiently low throughout the said treating step and the step of separation to prevent substantial conversion of the resins into the insoluble, infusible form.

3. In the process of producing fusible, soluble, resinous condensation products direct from a hydrocarbon oil containing tar acids in which the said oil is treated with an aldehyde-containing substance and a basic catalyst for the condensation reaction and the resultant reaction mixture is separated into a plurality of layers, one of which contains hydrocarbon oil having in colloidal solution therein a substantial amount of the said fusible, soluble, resinous condensation product, the steps which comprise treating the said hydrocarbon oil layer with a solution of a demulsifying agent for the colloidal solution while preventing the conversion of the condensation products to the infusible form, and separating from the residual oil the resinous condensation products thus liberated.

4. In the method of preparing a purified, substantially resin-free hydrocarbon oil from a tar oil containing tar acids in which the said tar oil is treated with an aldehyde-containing substance and a basic catalyst for the condensation reaction and the resultant reaction mixture is separated into a plurality of layers, one of which contains hydrocarbon oil having in suspension a substantial amount of the said resinous condensation product in potentially reactive form, the steps which comprise treating the unheated hydrocarbon oil layer with a solution of a demulsifying agent for the said suspension, and separating from the hydrocarbon oil the thus precipitated potentially reactive resinous condensation product while maintaining the latter in such unconverted form.

5. The method of recovering in soluble, fusible form, a synthetic resin of the phenol-formaldehyde potentially-reactive type from a suspension thereof in the hydrocarbon components of a low temperature tar distillate having a boiling range up to 300° C., which comprises treating the said suspension with approximately 15% by volume of a dilute aqueous solution of a mineral acid in amounts adapted to break the suspension and to cause precipitation of the resin in fusible, soluble form, and thereafter separating the said resin from the residual oil, the said treatment and step of separation being conducted at temperatures sufficiently low to prevent conversion of the resin to the infusible, insoluble form.

In testimony whereof I affix my signature.

MADHAV R. BHAGWAT.